(12) United States Patent
Ratner et al.

(10) Patent No.: US 8,107,510 B2
(45) Date of Patent: Jan. 31, 2012

(54) METHOD AND APPARATUS FOR NON-COOPERATIVE COEXISTENCE BETWEEN WIRELESS COMMUNICATION PROTOCOLS

(75) Inventors: Miri Ratner, Ramat-Gan (IL); Giora Rayzman, Rishon-LeZion (IL)

(73) Assignee: Intel Corporation, Santa Clara, CA (US)

( * ) Notice: Subject to any disclaimer, the term of this patent is extended or adjusted under 35 U.S.C. 154(b) by 1028 days.

(21) Appl. No.: 11/800,245

(22) Filed: May 4, 2007

(65) Prior Publication Data

US 2008/0273577 A1    Nov. 6, 2008

(51) Int. Cl.
*H04B 1/69* (2011.01)
*H04B 1/713* (2011.01)

(52) U.S. Cl. ......... 375/133; 375/141; 375/347; 375/348

(58) Field of Classification Search .................. 375/132, 375/133, 144, 148
See application file for complete search history.

(56) References Cited

U.S. PATENT DOCUMENTS

| | | | | |
|---|---|---|---|---|
| 5,781,864 | A * | 7/1998 | Reudink | 455/560 |
| 2004/0013168 | A1 * | 1/2004 | Haines et al. | 375/132 |
| 2005/0220135 | A1 * | 10/2005 | Honda et al. | 370/437 |
| 2008/0045152 | A1 * | 2/2008 | Boes | 455/63.1 |
| 2008/0205487 | A1 * | 8/2008 | Hu et al. | 375/132 |

* cited by examiner

*Primary Examiner* — Khanh C Tran
*Assistant Examiner* — Qutbuddin Ghulamali
(74) *Attorney, Agent, or Firm* — Cool Patent, P.C.; Joseph P. Curtin (57) ABSTRACT

A method and apparatus of reducing interference between wireless communication protocols is disclosed. The method comprises reducing interference between a first wireless communication protocol operating in a first frequency band and a second wireless communication protocol operating in a second frequency band by generating noise to cause interference with one or more frequencies in the second frequency band and performing Adaptive Frequency Hopping (AFH) in the second wireless communication protocol to avoid the one or more frequencies in the second frequency band in which interference is caused by the noise.

23 Claims, 5 Drawing Sheets

METHOD AND APPARATUS FOR NON-COOPERATIVE COEXISTENCE BETWEEN WIRELESS COMMUNICATION PROTOCOLS

FIELD OF THE INVENTION

The present invention relates generally to non-cooperative coexistence between wireless communication protocols used by wireless communication devices. In particular, the invention relates to reducing interference between subsystems employing two or more wireless communication protocols.

BACKGROUND OF THE INVENTION

The Institute of Electrical and Electronics Engineers (IEEE) 802.16 standard family of communications protocols, such as 802.16d, 802.16e and other variants commonly referred to as WiMAX (Worldwide Interoperability for Microwave Access), works, amongst other frequency bands, in licensed frequency bands, such as 2.3-2.4 GHz and 2.5-2.69 GHz. In some geographical regions/regulatory domains, the WiMAX frequency bands are in close proximity to the 2.4 GHz Bluetooth Industry Scientific and Medical (ISM) band. Consequently, there is considerable residual interference between WiMAX and Bluetooth (victim) and between Bluetooth and WiMAX (victim), which impedes normal reception of the victim communications protocol when the other interfering communications protocol is transmitting. Whilst in some environments, such as laptop platforms, antennae separation between WiMAX and Bluetooth may be relatively high, for example >18 dB, this separation is still not high enough to completely mitigate the interference. Thus, mitigation is needed for these types of interference.

In Bluetooth specification 1.2 and later specifications, Adaptive Frequency Hopping (AFH) is used to improve the performance of physical links in the presence of interference as well as reducing the interference caused by physical links on other devices in the ISM band of 2.4 GHz. When Bluetooth operates in AFH mode, only a subset of all available Bluetooth channels is used by the Bluetooth Master and Bluetooth Slave. When the Bluetooth Master senses interference in the 2.4 GHz ISM band, it adjusts the set of channels to use accordingly. Bluetooth devices that support AFH can operate on as few as 20 out of a total of 79 available channels when restricted by AFH.

BRIEF DESCRIPTION OF THE DRAWINGS

In order that the invention may be readily understood and put into practical effect, reference now will be made to embodiments of the present invention with reference to the accompanying drawings, wherein like reference numbers refer to identical elements. The drawings are provided by way of example only, wherein.

Skilled addressees will appreciate that elements in the figures are illustrated for simplicity and clarity and have not necessarily been drawn to scale. For example, the relative dimensions of some of the elements in the figures may be distorted to help improve understanding of embodiments of the present invention.

DETAILED DESCRIPTION

Before describing embodiments that are in accordance with the present invention in detail, it should be understood that the embodiments reside primarily in combinations of method steps and apparatus components related to reducing interference between two or more subsystems implementing wireless communication protocols. Accordingly, the apparatus components and method steps have been represented where appropriate by conventional symbols in the drawings, showing only those specific details that are relevant to understanding the embodiments of the present invention such that the disclosure is not obscured with details that will be readily apparent to those of ordinary skill in the art.

In this specification, the terms "comprises," "comprising," "includes", "including" or any other variation thereof, are intended to cover a non-exclusive inclusion, such that a method, process, article or apparatus that comprises a list of elements does not include only those elements, but may include other elements not expressly listed or inherent to such method, process, article or apparatus. An element preceded by, for example, "comprises a . . . " does not, without more constraints, preclude the existence of additional identical elements in the method, process, article or apparatus that comprises the element.

It will be appreciated that embodiments of the invention herein described may be comprised of one or more conventional processors and unique stored program instructions that control the one or more processors to implement, in conjunction with certain non-processor circuits, some, most, or all of the functions of reducing interference between two or more subsystems implementing wireless communication protocols as herein described. The non-processor circuits may include, but are not limited to, a radio receiver, a radio transmitter, signal drivers, clock circuits, power source circuits, and user input devices. As such, these functions may be interpreted as a method for reducing interference between two or more subsystems implementing wireless communication protocols. Alternatively, some or all functions could be implemented by a state machine that has no stored program instructions, or in one or more application specific integrated circuits (ASICs), Field-Programmable Gate Arrays (FPGAs), or other dedicated circuitry, in which each function or one or more combinations of the functions are implemented as custom logic. A combination of the two approaches could also be used. Thus, methods and means for these functions have been described herein. Further, it is expected that one of ordinary skill in the art, when guided by the disclosure herein, will be readily capable of generating such software instructions, programs and integrated circuits with minimal experimentation.

Figure 1:
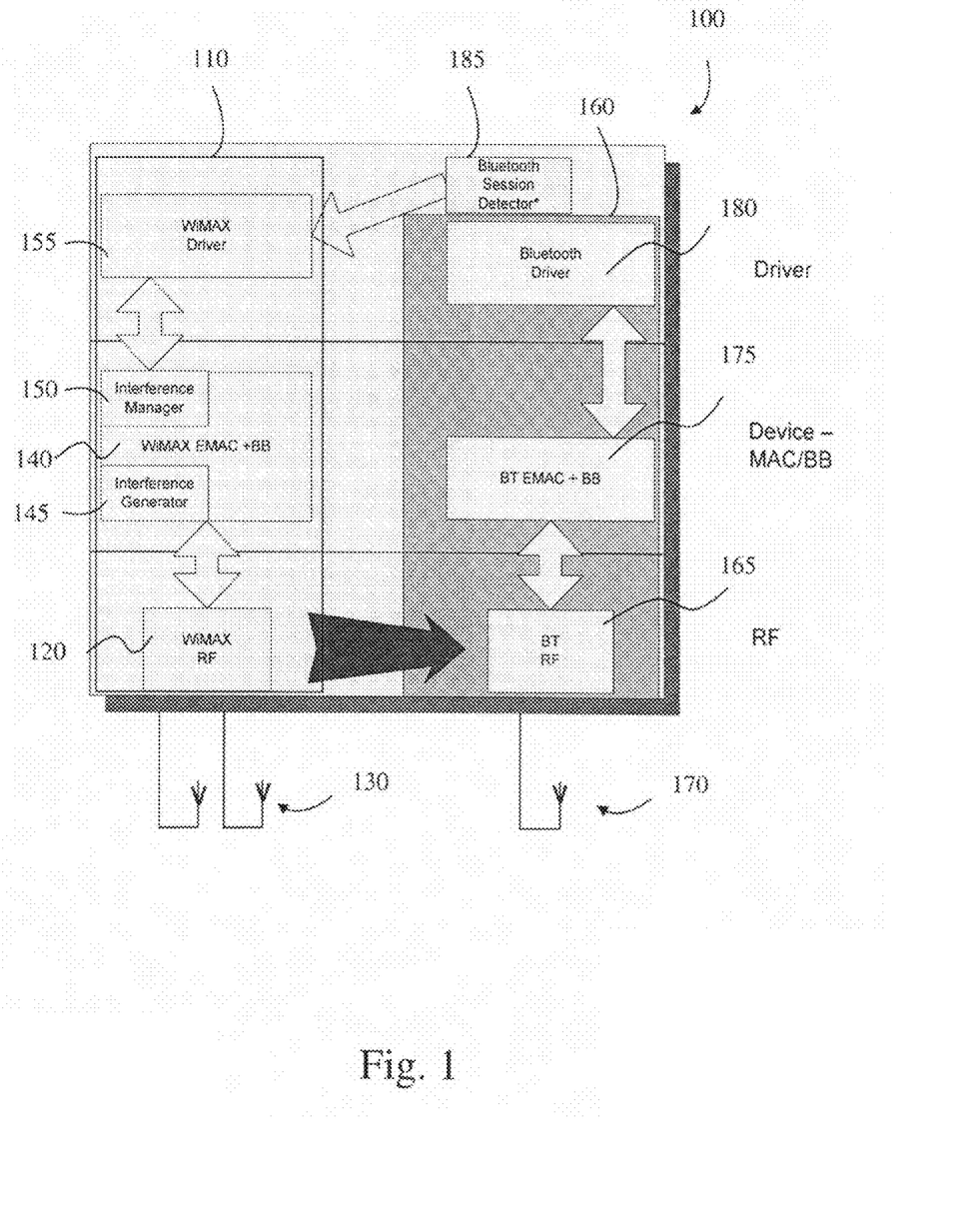
FIG. 1 is a schematic diagram illustrating an apparatus for reducing interference between subsystems implementing different wireless communication protocols according to some embodiments of the present invention.

With reference to FIG. 1 and in accordance with embodiments of the present invention, a schematic diagram illustrates an apparatus 100 for reducing interference between subsystems implementing different wireless communication protocols that are simultaneously in operation. Embodiments of the present invention can be implemented in, and are applicable to, wireless communication devices, such as, but not limited to, mobile telephones, notebook or laptop computers, personal digital assistants (PDAs), portable multimedia devices, mobile internet devices (MIDs), ultra mobile PCs (UMPCs), ultra mobile devices (UMDs) and other wireless communication devices.

According to some embodiments, apparatus 100 comprises a first subsystem 110 that implements a first wireless communication protocol. The first subsystem 110 comprises a first radio frequency (RF) transmitter/receiver 120 coupled to be in communication with a pair of antennae 130 for the first wireless communication protocol. In alternative embodiments, a single antenna or more than two antennae can be provided. The first radio frequency (RF) transmitter/receiver 120 is coupled to be in communication with a first Embedded Media Access Control (EMAC) and baseband (BB) module 140, which comprises a first sub-module in the form of an interference generator 145 and a second sub-module in the form of an interference manager 150. In alternative embodiments, the first and second sub-modules can be combined in a single sub-module. The first module 140 is coupled to be in communication with a first driver 155. According to some embodiments, the first driver 155 can comprise the interference generator 145 and/or the interference manager 150 as separate modules or as a single module. In some embodiments, the interference generator 145 and/or the interference manager 150 can reside completely separately in the platform. According to this embodiment, the first wireless communication protocol is WiMAX.

Apparatus 100 further comprises a second subsystem 160 that implements a second wireless communication protocol. The second subsystem 160 comprises a second radio frequency (RF) transmitter/receiver 165 coupled to be in communication with an antenna 170 for the second wireless communication protocol. In alternative embodiments, instead of a separate antenna 170 being provided, the second radio frequency (RF) transmitter/receiver 165 can share the one or more antennae 130, which can be statically or dynamically assigned to each subsystem 110, 160 as required. The second radio frequency (RF) transmitter/receiver 165 is coupled to be in communication with a second Embedded Media Access Control (EMAC) and baseband (BB) module 175. The second module 175 is coupled to be in communication with a second driver 180. A detector in the form of a session detector 185 for the second wireless communication protocol is coupled to be in communication with, and in some embodiments can form part of, the first subsystem 110. According to some embodiments, the interference generator 145 and/or the interference manager 150 can be provided as separate modules or as a single module in the module 175 or the second driver 180. According to this embodiment, the second wireless communication protocol is Bluetooth.

It will be appreciated that whilst FIG. 1 illustrates that the first and second subsystems 110, 160 are provided in a single apparatus 100, the first and second subsystems 110, 160 can be implemented in separate devices. Hence, embodiments of the present invention are applicable to reducing interference between subsystems that are provided within a single device or within multiple devices.

Figure 2:
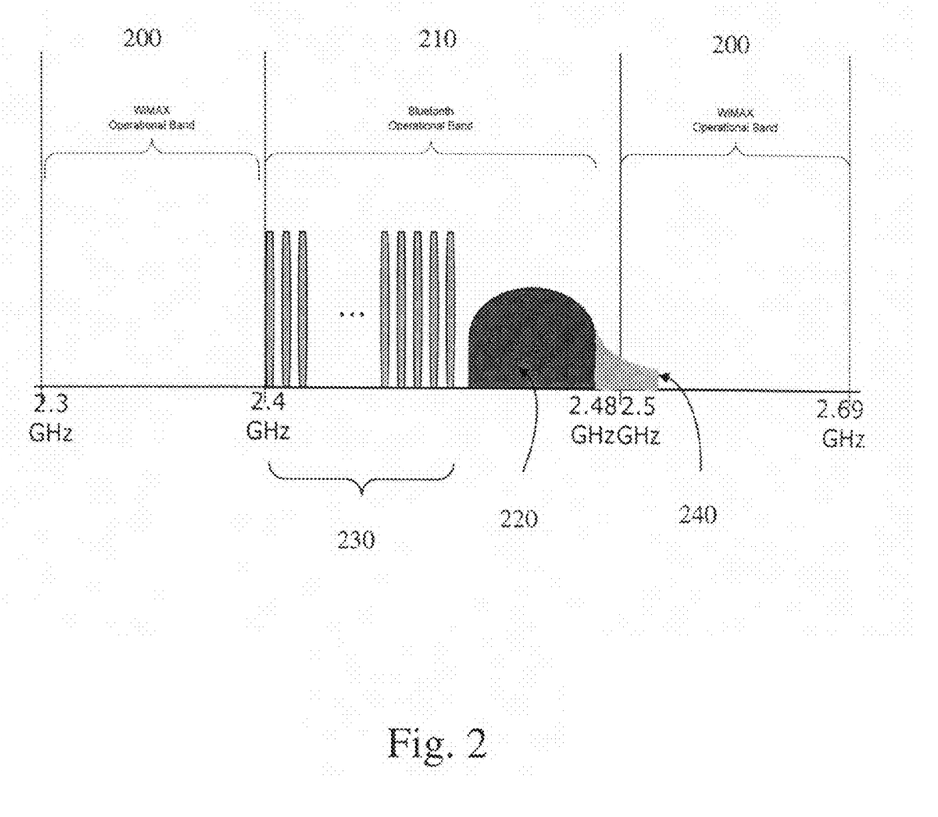
FIG. 2 shows a frequency spectrum illustrating a method for reducing interference between subsystems implementing different wireless communication protocols according to an embodiment of the present invention.

With reference to FIG. 2, the first subsystem 110 implements the first wireless communication protocol operating in a first frequency band 200 and the second subsystem 160 implements a second wireless communication protocol operating in a second frequency band 210. In the example shown in FIG. 2, the first wireless communication protocol is WiMAX having operational frequency bands of 2.3-2.4 GHz and 2.5-2.69 GHz and the second wireless communication protocol is Bluetooth operating in the 2.4 GHz ISM frequency band. The second wireless communication protocol employs Adaptive Frequency Hopping (AFH).

Embodiments of the present invention provide a method and apparatus of reducing interference between the first subsystem 110 and the second subsystem 160 by generating artificial noise to cause interference with one or more frequencies in the second frequency band. The method includes performing Adaptive Frequency Hopping in the second wireless communication protocol to avoid the one or more frequencies in the second frequency band in which interference is caused by the artificial noise.

Thus, interference that the second subsystem 160 may cause to the first subsystem 110 is reduced, by the second subsystem 160 not operating in the one or more frequencies in which interference is artificially caused. As shown schematically in FIG. 2, the one or more frequencies to be avoided by the second subsystem 160 form a frequency mask or map 220 of prohibited frequencies that are avoided by the AFH employed by the second wireless communication protocol. The remaining frequencies 230 in the second frequency band are utilized by the second subsystem 160 employing the AFH method. FIG. 2 includes region 240, which represents the residual interference that occurs when the second wireless subsystem 160, implementing the second communication protocol, uses the frequencies, corresponding to region 220, in the second frequency band 210. The residual interference is minimized by virtue of the frequency mask 220.

Embodiments of the present invention also can reduce interference in the second subsystem 160 that may be caused by the first subsystem 110 operating in the one or more frequencies utilized by the second wireless communication protocol.

Figure 3:
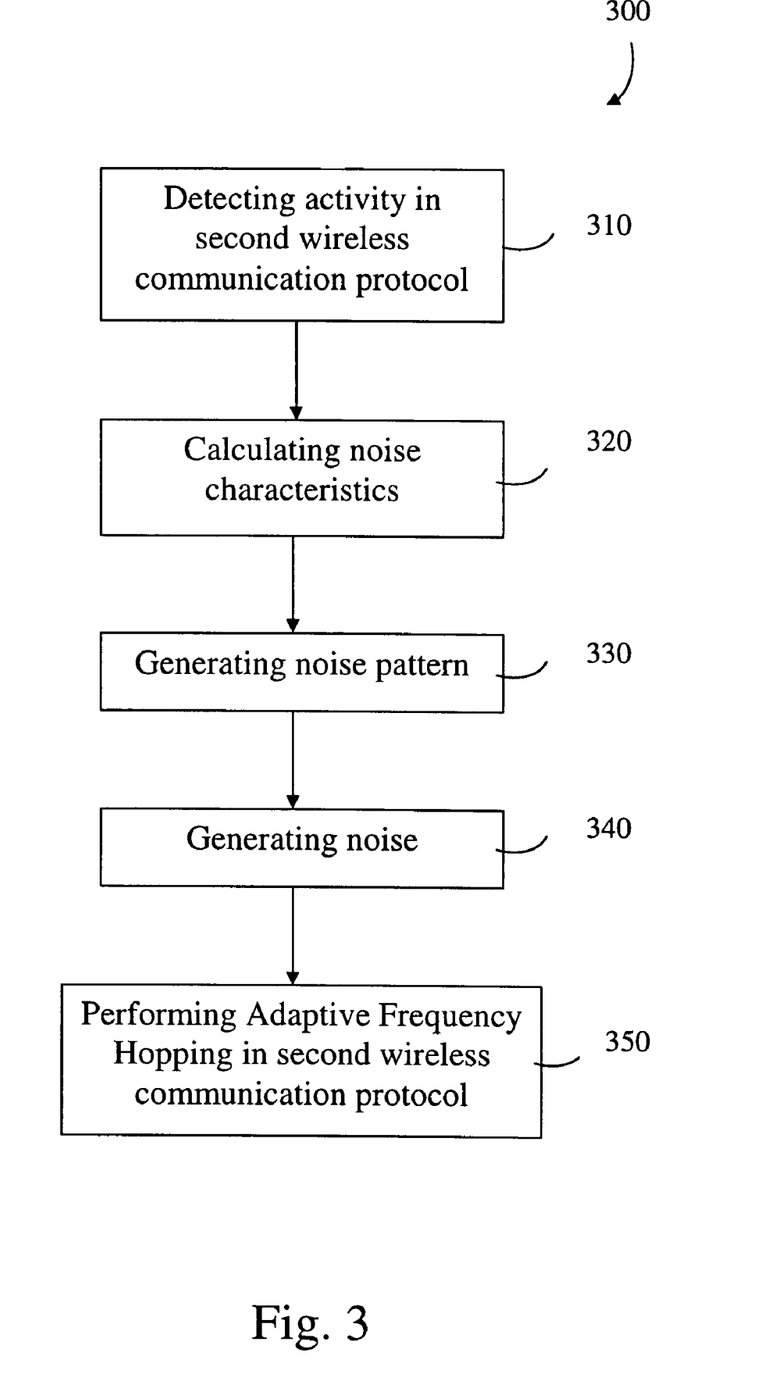
FIG. 3 is a flowchart illustrating a method for reducing interference between subsystems implementing different wireless communication protocols according to embodiments of the present invention.

Embodiments of the method of the present invention will now be described with reference to the flowchart shown in FIG. 3. The method 300 for reducing interference between subsystems implementing different wireless communication protocols operating in the first and second frequency bands 200, 210 includes at 310 detecting activity in the second frequency band 210 of the second wireless communication protocol. This activity detection may be direct, that is by observing the radio spectrum or via the session detector 185. Once activity has been detected, the method includes at 320 the interference manager 150 calculating characteristics of the artificial noise. The characteristics include, but are not limited to, timing, frequency span, transmission power and noise pattern. According to some embodiments, calculating the noise characteristics includes minimizing interference in a first wireless communication protocol cell.

According to some embodiments, calculating characteristics of the artificial noise can be on the basis of a frequency separation between the one or more frequencies in use by the first subsystem 110 and the one or more frequencies in use by the second subsystem 160.

According to some embodiments, calculating characteristics of the artificial noise can be on the basis of an isolation between the at least one antenna 130 used for the first subsystem 110 and the at least one antenna 170 used for the second subsystem 160, the isolation being known a priori and/or stored in a configuration description, such as a file, EEPROM, FLASH, or other memory, for the specific platform in which the invention is implemented.

In alternative embodiments, calculating characteristics of the artificial noise can be on the basis of signal quality. The method can include measuring the quality of the signal in the frequencies required for the wireless communication protocol and calculating the frequency mask 220 used for AFH such that only the frequencies above a predetermined threshold signal quality are utilized.

In yet further embodiments, calculation of the one or more frequencies to be avoided by the second subsystem 160 can be on the basis of one or more of the following: special detection or sensing of media status and/or conditions; prior configurations between subsystems; remote requests. The special detection or sensing of media status and/or conditions can include measuring factors such as packet loss rates, error rates, number of retransmissions and other such parameters from the physical and media access control (MAC) layers. In other embodiments, frequencies outside the frequency band 200 for the first wireless communication protocol can be scanned for patterns in the physical layer. The use of prior configurations between subsystems can benefit from previous good configurations in order to speed up the calculation of the frequency mask 220 in subsequent calculations. Regarding the utilization of remote requests, the remote request can be from the subsystem to a remote server or application, such as the platform or a base station that stores, for example, more sophisticated frequency allocation algorithms or the isolation parameters. In response to the request, the isolation parameters, frequency mask for AFH or other data in communicated to the requesting subsystem.

The method 300 includes at 330 the interference generator 145 generating the artificial noise pattern according to the calculations received from the interference manager 150. The noise pattern is communicated from the interference generator 145 to the first radio frequency (RF) transmitter/receiver 120 and the method includes at 340 generating the artificial noise. The noise patterns are in, or close to, the second frequency band 210 for the second wireless communication protocol and consequently, interference is detected in frequencies of the second wireless communication protocol. The method includes at 350 performing Adaptive Frequency Hopping in the second wireless communication protocol to avoid the one or more frequencies in the second frequency band 210 in which interference is caused by the artificial noise.

Embodiments of the present invention include re-generating the artificial noise when a new regulatory domain is encountered by the apparatus 100 in which the first frequency band 200 and/or the second frequency band 210 change, although in embodiments where the second communication protocol is Bluetooth, the second frequency band 210 is unlikely to change. For example, consider the apparatus 100 located in a first regulatory domain in which the first frequency band 200 for the first wireless communication protocol is 2.5-2.69 GHz. If the apparatus 100 is moved to a second regulatory domain in which the first frequency band 200 for the first wireless communication protocol is 2.3 GHz, the present invention automatically re-generates the artificial noise to cause interference in frequencies close to the new boundary between the first and second bands 200, 210. The process of AFH employed in the second wireless communication protocol thus avoids the one or more frequencies used by the first subsystem 110 in the new regulatory domain without the need for user intervention.

Figure 4:
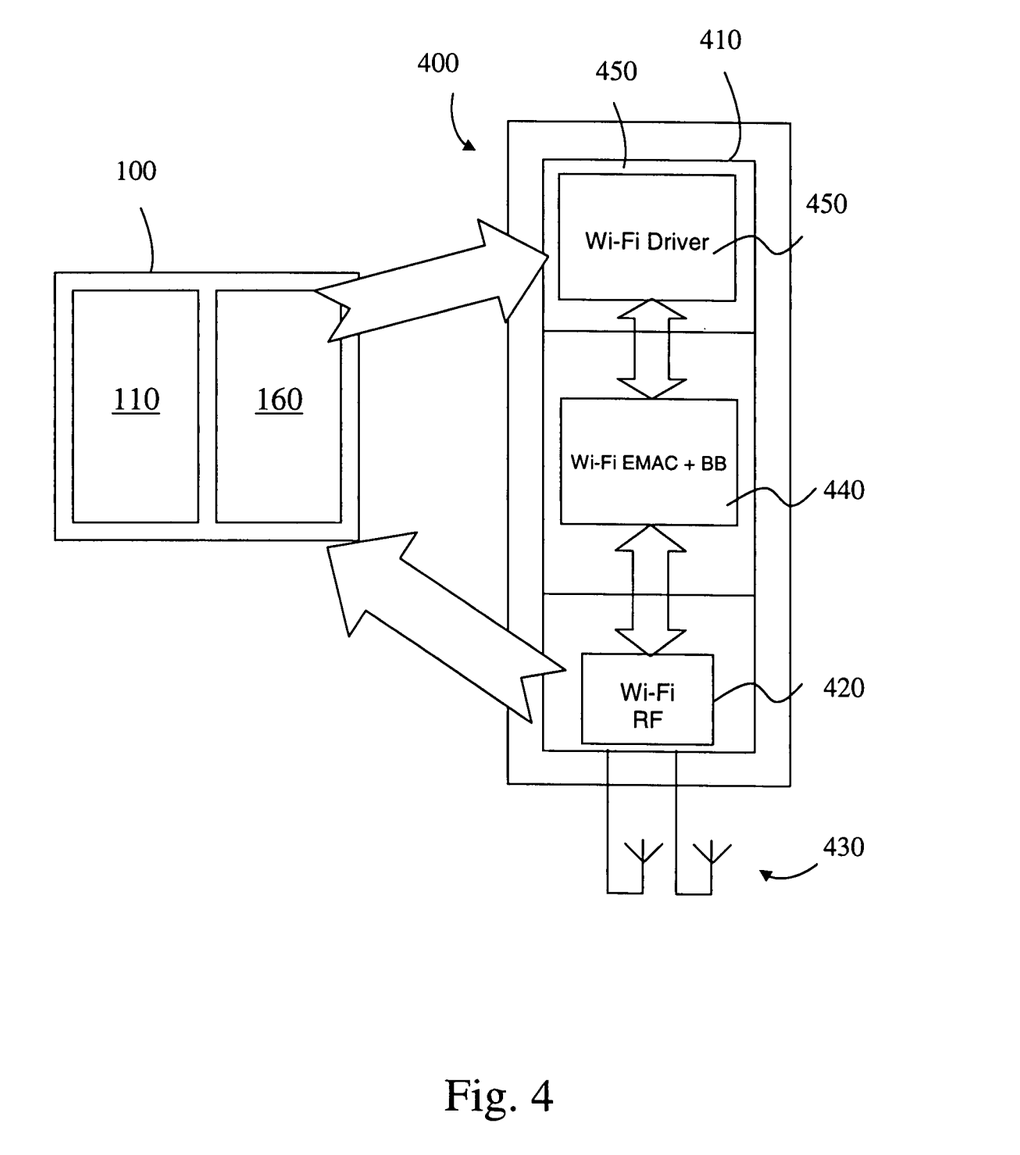
FIG. 4 is a schematic diagram illustrating two apparatus for reducing interference between subsystems implementing different wireless communication protocols according to alternative embodiments of the present invention.

FIG. 4 shows the apparatus 100 shown in FIG. 1, but without most of the components, which have been omitted for the sake of clarity. FIG. 4 also shows an apparatus 400 according to some embodiments of the present invention. With reference to FIG. 4, the apparatus 400 comprises a third subsystem 410 that implements a third wireless communication protocol. The third subsystem 410 comprises a third radio frequency (RF) transmitter/receiver 420 coupled to be in communication with a pair of antennae 430 for the third wireless communication protocol. In alternative embodiments, a single antenna or more than two antennae can be employed. In some embodiments, a set of antennae common to all subsystems or devices can be provided and one or more of the antennae can be statically or dynamically assigned to each subsystem as required. The third radio frequency (RF) transmitter/receiver 420 is coupled to be in communication with a third Embedded Media Access Control (EMAC) and baseband (BB) module 440, which, in some embodiments, can comprise the first and second sub-modules in the forms of interference generator 145 and the interference manager 150 as separate modules or as a single module as described above in relation to the first subsystem 110 of apparatus 100. The third module 440 is coupled to be in communication with a third driver 450, which can comprise the interference generator 145 and the interference manager 150 as described above in relation to the first subsystem 110 of apparatus 100. According to this embodiment, the third wireless communication protocol is Wi-Fi. FIG. 4 also shows schematically artificial noise being transmitted from the third radio frequency (RF) transmitter/receiver 420 to the second radio frequency (RF) transmitter/receiver 165 of the second subsystem 160 of apparatus 100 and communication between the detector 185 of apparatus 100 and the third driver 450.

Although FIG. 4 represents the first and second subsystems 110, 160 implemented in apparatus 100 and the third subsystem 410 implemented in apparatus 400, it will be appreciated that the subsystems 110, 160, 410 can be implemented in a single apparatus or in separate devices. Alternatively, any two of the subsystems can be implemented in a first device and the other subsystem implemented in a second device.

According to some embodiments of the method of the present invention, the method includes reducing interference between the third subsystem 410 implementing the third wireless communication protocol operating in the second frequency band 210 or a third frequency band and the first subsystem 110 and the second subsystem 160. According to these embodiments, the method includes performing Adaptive Frequency Hopping in the second wireless communication protocol to avoid the one or more frequencies in the second frequency band 210 in which interference is caused by the artificial noise. Hence, interference in the first and third frequency bands is at least reduced.

Embodiments of the present invention include calculating one or more of the following characteristics of the noise to reduce interference by the second subsystem 160 in the first subsystem 110 and the third subsystem 410: timing, frequency span, transmission power, noise pattern. For example, a first noise pattern can be generated by the first radio frequency (RF) transmitter/receiver 120 to protect the first subsystem 110 against interference from the second subsystem 160. A second noise pattern can be generated by the third radio frequency (RF) transmitter/receiver 420 to protect the third subsystem 410 against interference from the second subsystem 160. Alternatively, a single noise pattern can be generated by one of the radio frequency (RF) transmitter/receivers 120, 420 that protects both the first and third subsystems 110, 410 against interference from the second subsystem 160.

According to one embodiment, the first wireless communication protocol is WiMAX, the second wireless communication protocol is Bluetooth and the third wireless communication protocol is Wi-Fi.

Figure 5:
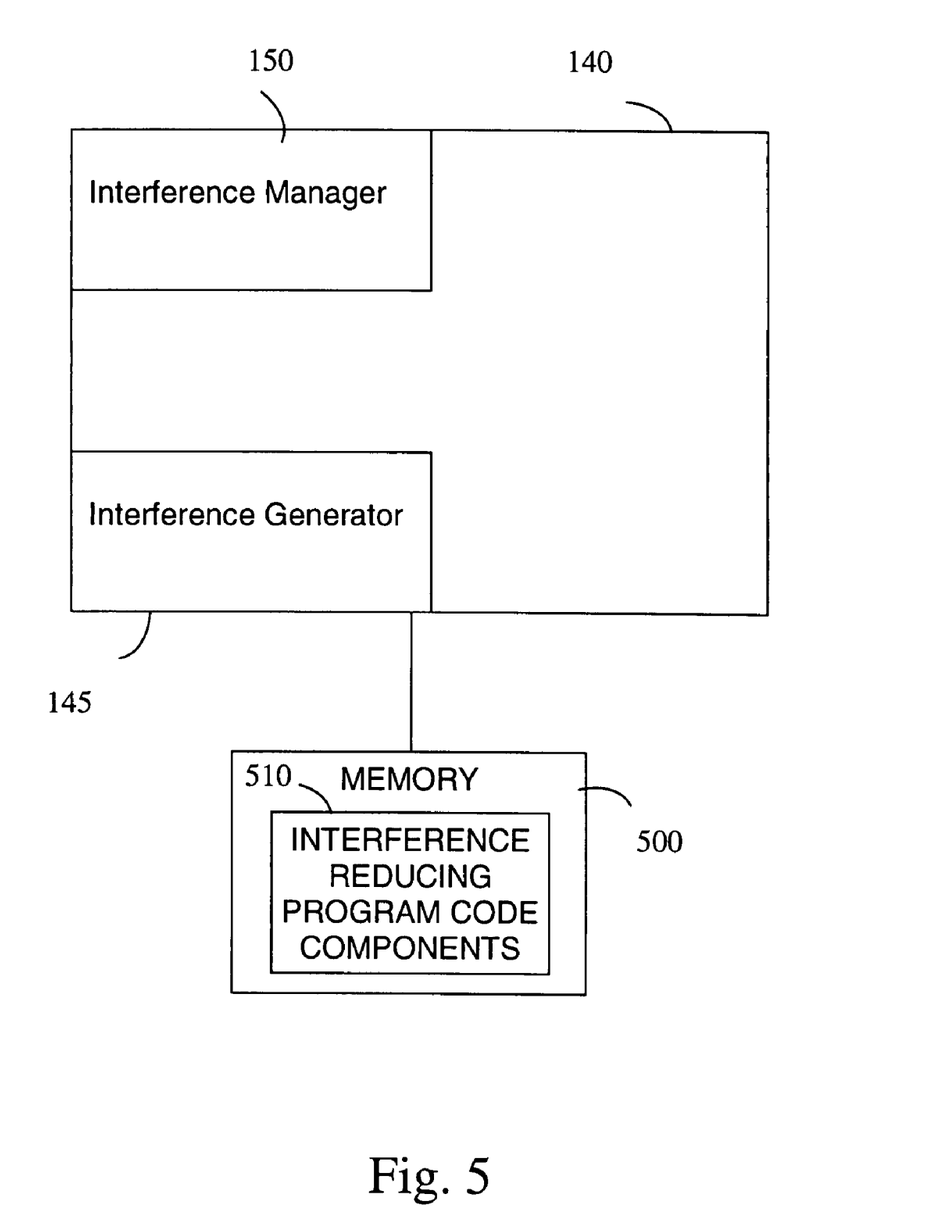
FIG. 5 a schematic diagram illustrating further components of the apparatus shown in FIG. 1 according to embodiments of the present invention.

Referring to FIG. 5, a schematic diagram illustrates some of the components of the apparatus 100 according to some embodiments of the present invention. As described above, one or more apparatus 100 comprises one or more subsystems comprising EMAC and BB modules 140, 175, 440, each of which can be in the form of a processor, such as a standard microprocessor, ASIC, FPGA or the like for implementing the method as described herein. For example, module 140 can be operatively coupled to a storage medium in the form of a memory 500. The memory 500 comprises a computer-readable medium, such as a random access memory (e.g., static random access memory (SRAM), or synchronous dynamic random access memory (SDRAM)), read only memory (e.g., programmable read only memory (PROM), or electrically erasable programmable read only memory (EEPROM)), or hybrid memory (e.g., FLASH), or other types of memory suitable for the said type of storage, as is well known in the art. The computer-readable medium comprises computer-readable program code components 510 for reducing interference between subsystems implementing different wireless communication protocols in accordance with the teachings of the present invention, at least some of which are selectively executed by the module 140 and are configured to cause the execution of the method described herein.

Advantages of the various embodiments of the present invention thus include the reduction of interference between simultaneously operating subsystems 110, 160, 410 implementing different wireless communication protocols thus avoiding degradation of voice quality in voice calls and a reduction in data transfer rates. Embodiments of the present invention include generating artificial noise to cause interference with one or more frequencies in the second frequency band and performing Adaptive Frequency Hopping in the second wireless communication protocol to avoid the one or more frequencies in the second frequency band in which interference is caused by the noise. Hence, interference of the first subsystem 110, and in some embodiments the third subsystem 410, and consequently the second subsystem 160 is at least reduced if not avoided altogether. Embodiments of the present invention enable, for example, a Voice over Internet Protocol (VoIP) call over the WiMAX wireless communication protocol while the Bluetooth wireless communication protocol is used to connect the same device to a wireless headset with minimal interference between the two communication protocols.

According to some embodiments of the present invention, interference can be reduced between the third subsystem 410 implementing a third wireless communication protocol, such as Wi-Fi, operating in the second or third frequency bands and the second subsystem 160 as well as reducing interference between the first and second subsystems, thus allowing three different wireless communication protocols to be used simultaneously.

Embodiments of the present invention provide an efficient and straightforward solution for reducing interference between subsystems implementing different wireless communication protocols with minimal modifications to the subsystems. Embodiments of the present invention are particularly useful where there is no programmable control over devices implementing one of the wireless communication protocols provided by third party vendors. Furthermore, embodiments of the present invention provide automatic adaptation to new regulatory domains such that interference between the subsystems is avoided when the device(s) in which the invention is implemented is/are used in different countries or regulatory regions in which the frequency band for one or more of the wireless communication protocols may be different.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

What is claimed:

1. A method, comprising:
reducing interference between a first subsystem implementing a first wireless communication protocol operating in a first frequency band and a second subsystem implementing a second wireless communication protocol operating in a second frequency band by the first subsystem generating artificial noise to cause interference based on the artificial noise with one or more frequencies in the second frequency band, the first wireless communication protocol being different from the second wireless communication protocol, and the first frequency band being different from the second frequency band; and
performing Adaptive Frequency Hopping in the second wireless communication protocol to avoid the one or more frequencies in the second frequency band in which interference is caused by the artificial noise reducing interference between the first subsystem and the second subsystem in the first frequency band.

2. The method of claim 1, further comprising:
generating the artificial noise on the basis of a frequency separation between the one or more frequencies in use by the first subsystem and the one or more frequencies in use by the second subsystem.

3. The method of claim 1, further comprising:
generating the artificial noise on the basis of an isolation between at least one antenna used for the first subsystem and at least one antenna used for the second subsystem.

4. The method of claim 1, further comprising:
generating the artificial noise on the basis of one of the following: signal quality; special media detection; prior configuration; remote request.

5. The method of claim 1, further comprising:
re-generating the artificial noise when a new regulatory domain is encountered in which the first frequency band and/or the second frequency band change.

6. The method of claim 1, wherein the first wireless communication protocol is WiMAX and the second wireless communication protocol is Bluetooth.

7. The method of claim 1, further comprising:
reducing interference between the first subsystem, the second subsystem and a third subsystem by generating the artificial noise to cause interference based on the artificial noise with one or more frequencies in the second frequency band, the third subsystem implementing a third wireless communication protocol operating in a second or third frequency band.

8. The method of claim 7, wherein the first wireless communication protocol is WiMAX, the second wireless communication protocol is Bluetooth and the third wireless communication protocol is Wi-Fi.

9. The method of claim 7, further comprising:
calculating one or more of the following characteristics of the artificial noise to reduce interference by the second subsystem in the first subsystem and the third subsystem: timing, frequency span, transmission power, pattern.

10. The method of claim 1, further comprising:
minimizing interference in a first wireless communication protocol cell by calculating one or more of the following characteristics of the artificial noise: timing, frequency span, transmission power, pattern.

11. The method of claim 10, further comprising:
calculating the one or more characteristics of the artificial noise at a Media Access Control/Baseband level or a driver level.

12. An article comprising: a non-transitory computer readable medium having stored thereon instructions that, if executed, result in at least the following:
reduce interference between a first subsystem implementing a first wireless communication protocol operating in a first frequency band and a second subsystem implementing a second wireless communication protocol operating in a second frequency band by the first subsystem generating artificial noise to cause interference based on the artificial noise with one or more frequencies in the second frequency band, the first wireless communication protocol being different from the second wireless communication protocol, and the first frequency band being different from the second frequency band; and
perform Adaptive Frequency Hopping in the second wireless communication protocol to avoid the one or more frequencies in the second frequency band in which interference is caused by the artificial noise reducing interference between the first subsystem and the second subsystem in the first frequency band.

13. The article of claim 12, further comprises generating the artificial noise on the basis of a frequency separation between the one or more frequencies in use by the first subsystem and the one or more frequencies in use by the second subsystem.

14. The article of claim 12, further comprises generating the artificial noise on the basis of an isolation between at least one antenna used for the first subsystem and at least one antenna used for the second subsystem.

15. The article of claim 12, further comprises generating the artificial noise on the basis of one of the following: signal quality; special media detection; prior configuration; remote request.

16. The article of claim 12, further comprises re-generating the artificial noise when a new regulatory domain is encountered in which the first frequency band and/or the second frequency band change.

17. The article of claim 12, wherein the first wireless communication protocol is WiMAX and the second wireless communication protocol is Bluetooth.

18. The article of claim 12, further comprises reducing interference between the first subsystem, the second subsystem and a third subsystem by generating the artificial noise to cause interference based on the artificial noise with one or more frequencies in the second frequency band, the third subsystem implementing a third wireless communication protocol operating in a second or third frequency band.

19. The article of claim 18, wherein the first wireless communication protocol is WiMAX, the second wireless communication protocol is Bluetooth and the third wireless communication protocol is Wi-Fi.

20. The article of claim 18, further comprises calculating one or more of the following characteristics of the artificial noise to reduce interference by the second subsystem in the first subsystem and the third subsystem: timing, frequency span, transmission power, pattern.

21. The article of claim 12, further comprises minimizing interference in a first wireless communication protocol cell by calculating one or more of the following characteristics of the artificial noise: timing, frequency span, transmission power, pattern.

22. The article of claim 21, wherein calculating the one or more characteristics is executed at a Media Access Control/Baseband level or a driver level.

23. A processor to reduce interference between a first subsystem implementing a first wireless communication protocol operating in a first frequency band and a second subsystem implementing second wireless communication protocol operating in a second frequency band, the first wireless communication protocol being different from the second wireless communication protocol, and the first frequency band being different from the second frequency band, the processor comprising:
an artificial noise generator capable of generating artificial noise to cause interference based on the artificial noise with one or more frequencies in the second frequency band; and
a frequency-hopping controller capable of performing Adaptive Frequency Hopping in the second wireless communication protocol to avoid the one or more frequencies in the second frequency band in which interference is caused by the artificial noise reducing interference between the first subsystem and the second subsystem in the first frequency band.

* * * * *